United States Patent Office
3,464,960
Patented Sept. 2, 1969

3,464,960
MIXTURE FOR RAPID POLYMERIZATION
James F. Sobieski and Michael C. Zerner, Eatontown, N.J., assignors to the United States of America as represented by the Secretary of the Army
No Drawing. Filed Dec. 15, 1967, Ser. No. 691,069
Int. Cl. C08f 1/70, 1/72, 1/00
U.S. Cl. 260—80.3                            7 Claims

ABSTRACT OF THE DISCLOSURE

A mixture is provided that can be rapidly polymerized upon the application of an electric potential across an anode and a cathode contained in the mixture. The mixture is also stable in the absence of an electric current. The mixture is comprised of a suitable solvent, at least one monomer dispersed or dissolved in the solvent, the monomer dispersion or solution also including a soluble zinc salt.

---

The invention described herein may be manufactured, used and licensed by or for the Government for governmental purposes without the payment to us of any royalty thereon.

Background of the invention

This invention relates to mixtures that can be rapidly polymerized by the passage of an electric current between an anode and a cathode contained therein, the mixtures also being stable in the absence of an electric current.

It has been known for some time that polymerization can be initiated by the passage of an electric current between an anode and a cathode contained in a suitable mixture. Such a mixture includes at least one monomer and initiators, the latter of which are affected by the application of an electric potential and the ensuing current flow. Many of these mixtures have not been entirely satisfactory in that:

(1) they are not stable for long periods of time in the absence of an electric current;
(2) their polymerization has not been controllable; that is polymerization could not be stopped when the current was stopped so that bulk polymerization would ensue; and
(3) the formation of polymer is not sufficiently current sensitive for many applications.

The general object of this invention is to provide a mixture that can be rapidly polymerized on the passage of an electric current between electrodes contained therein, the mixture also being stable in the absence of an electric current. A further object of the invention is to provide such a mixture wherein polymerization occurs only at a cathode, to which the resulting polymer adheres. A still further object of the invention is to provide such a mixture wherein polymerization is stopped once the current is stopped, so that bulk polymerization of the entire mixture does not ensue. Another object of the invention is to provide such a mixture in which polymerization can be initiated upon the passage of a minimal current.

Summary of the invention

The mixtures, according to this invention, are comprised of at least one monomer and initiators in a common solvent, in emulsion, in gels, etc. More specifically, the solvent or dispersing medium is one in which the other ingredients are soluble or can be suspended or dispersed. The solvent can be a liquid, or it can be a "solid" gel. When the other ingredients are added to it, the mixture must conduct an electric current. If not, electrolytes must be added which will cause it to pass current. The monomer or monomers used are ethylenical unsaturated materials such as acrylamide, other acrylic compounds, substituted acrylic compounds, vinyl compounds, substituted vinyl compounds, etc. The initiating system is comprised of a soluble zinc salt as, for example, zinc chloride, zinc sulfate, zinc acetate or zinc nitrate. The concentration of the zinc salt ranges from about the same order of magnitude as the mole concentration of the monomer to about 10 times this amount. Also present may be a trace of a soluble copper salt as, for example, cupric chloride. This copper salt serves as a sensitizer, speeding the rate of polymerization, and improving the adhesion of the polymer to the cathode. If water or alcohol is the solvent for the zinc and copper salts, the solution should be buffered between pH 3.5 and 5.5 for maximum speed and adhesion. Moreover, at these pH's, very little zinc plates out with the polymer. If the zinc and copper compounds chosen are soluble in the liquid monomer, the dispersing media or solid may not be needed.

The major advantage of the mixtures of this invention is the combination of their stability over a long period of time in the absence of an electric current, and their rapid speed of polymerization in the presence of modest amounts of current.

The mixtures of the invention have many applications, such as in coating conducting surfaces with polymer to insulate them electrically or protect them from corrosion, and in photoelectrolytically controlled polymerization used in image formation. Such photoelectrolytically controlled polymerization occurs in the devices as disclosed and claimed in the U.S. patent applications of Hodes and Zerner for Photoelectric Imaging Device, S.N. 670,815 and S.N. 670,816 filed Sept. 26, 1967, and assigned to the same assignee.

Detailed description of the preferred embodiment

Into an aqueous solution of 10 percent by weight of acrylamide, 1 percent N,N'-methylenebisacrylamide, 0.5 Normal in zinc chloride with traces of copper chloride is placed two electrodes about 1 centimeter apart. The electrodes can be made of any metal or conductor stable in water as, for example, steel, copper, aluminum and lead. When a voltage of 9.0 volts is applied across the electrodes, an adhering polymer layer 0.1 mm. in thickness is formed on the cathode in less than 0.005 second. The speed of formation of polymer is a function of the applied voltage, and the cell resistance of the system of interest. Adjusting the pH to 5.0 to 5.5 improves the speed of polymer formation, and its adhesion to the cathode. Traces of percompounds, as persulfates, perborates, peroxide, etc. can improve the rate of polymer formation. For example, 0.01 percent hydrogen peroxide can improve the rate of polymerization. Increasing the concentration of monomers as, for example, 30 percent by weight acrylamide and 4 percent N,N' - methylenebisacrylamide, also increases the rate of polymerization.

The exact nature of the initiation is not known. Judging from the great variety of monomers that can be used as, for example, acrylamide, acrylonitrile, acrylic acid, vinyl acetate, N-vinyl-2-pyrrolidone, metal acrylates, etc., in alcoholic or aqueous solutions or suspension, the mechanism is no doubt, one of free radical initiation, with formation of the free radicals directly at the cathode. Radical initiators react positively at the cathode.

The most likely mechanism involves the complexing of dissolved oxygen by the zinc ions; that is, $$Zn^{+2} + O_2 \rightarrow ZnO_2^{+2}$$

Electrolysis then yields (1)
$$ZnO_2^{+2} + e \rightarrow ZnO_2^{+}$$
$$ZnO_2^{+} \rightarrow Zn^{+2} + O_2^{-}$$
$$O_2^{-} + H_2O \rightarrow HO_2 \cdot (\text{radical}) + OH^{-}$$

or (2)
$$ZnO_2^{+2} + 3e \rightarrow Zn + O_2^{-}$$
$$O_2^{-} + H_2O \rightarrow HO_2 \cdot + OH^{-}$$

Initiation is then caused by $HO_2 \cdot$ (radical) or by hydroxyl free radicals $(HO \cdot)$ resulting from $$H_2O + HO_2 \cdot \rightarrow H_2O_2 + HO \cdot$$
$$H_2O_2 \rightleftharpoons 2HO \cdot (\text{radical})$$

Depending on the pH of the solution used, metallic zinc may plate on the cathode as shown in Equation 2. If so, a further reaction producing free radical may occur.

$$Zn + 2H_3O^{+} + 2H_2O_2 \rightarrow Zn^{+2} + 4H_2O + 2HO \cdot$$

Polymer formed in media of pH 5.5 or greater is colored somewhat by deposited zinc. Before the polymer has dried and lost its porous nature, this co-deposited zinc can be removed by washing in dilute acid.

The foregoing description is to be considered merely as illustrative of the invention and not in limitation thereof.

What is claimed is:

1. A mixture capable of rapid polymerization on the passage of an electric current between an anode and a cathode contained therein whereby said rapid polymerization occurs only at the cathode, the mixture also being characterized by stability in the absence of an electric current, said mixture comprising a solvent taken from the group consisting of water and alcohol, at least one monomer in said solvent wherein the monomer is an ethylenic unsaturated material taken from the group consisting of acrylic compounds, substituted acrylic compounds, vinyl compounds, and substituted vinyl compounds, and a soluble zinc salt in said monomer dispersion wherein the soluble zinc salt is selected from the group consisting of zinc chloride, zinc sulfate, zinc acetate and zinc nitrate and wherein the concentration of the zinc salt ranges from about the same order of magnitude as the mole concentration of the monomer to about ten times this amount, the pH of the mixture being in the range 3.5 to 5.5.

2. A mixture according to claim 1 wherein a trace of a soluble copper salt is present.

3. A mixture according to claim 2 wherein the soluble copper salt is cupric chloride.

4. A mixture according to claim 1 wherein 0.01 percent hydrogen peroxide is present.

5. A mixture according to claim 2 wherein 0.01 percent hydrogen peroxide is present.

6. A mixture according to claim 2 wherein the solvent is water, the monomers are 10 percent by weight of acrylamide and 1 percent by weight of N,N'-methylenebisacrylamide, the soluble zinc salt is zinc chloride, and the copper salt is cupric chloride.

7. A mixture according to claim 6 wherein 0.01 percent hydrogen peroxide is present.

References Cited

UNITED STATES PATENTS 2,726,204  12/1955  Park et al. _____ 204—72
3,335,074  8/1967  Borman _____ 204—59

FOREIGN PATENTS 1,210,186  2/1966  Germany.

JOSEPH L. SCHOFER, Primary Examiner

W. F. HAMROCK, Assistant Examiner

U.S. Cl. X.R.

204—59, 72; 260—29.6, 80, 88.3, 88.7, 89.1, 89.7